E. Sheetz,
Water Wheel.
Nº 8,430.          Patented Oct. 14, 1851.
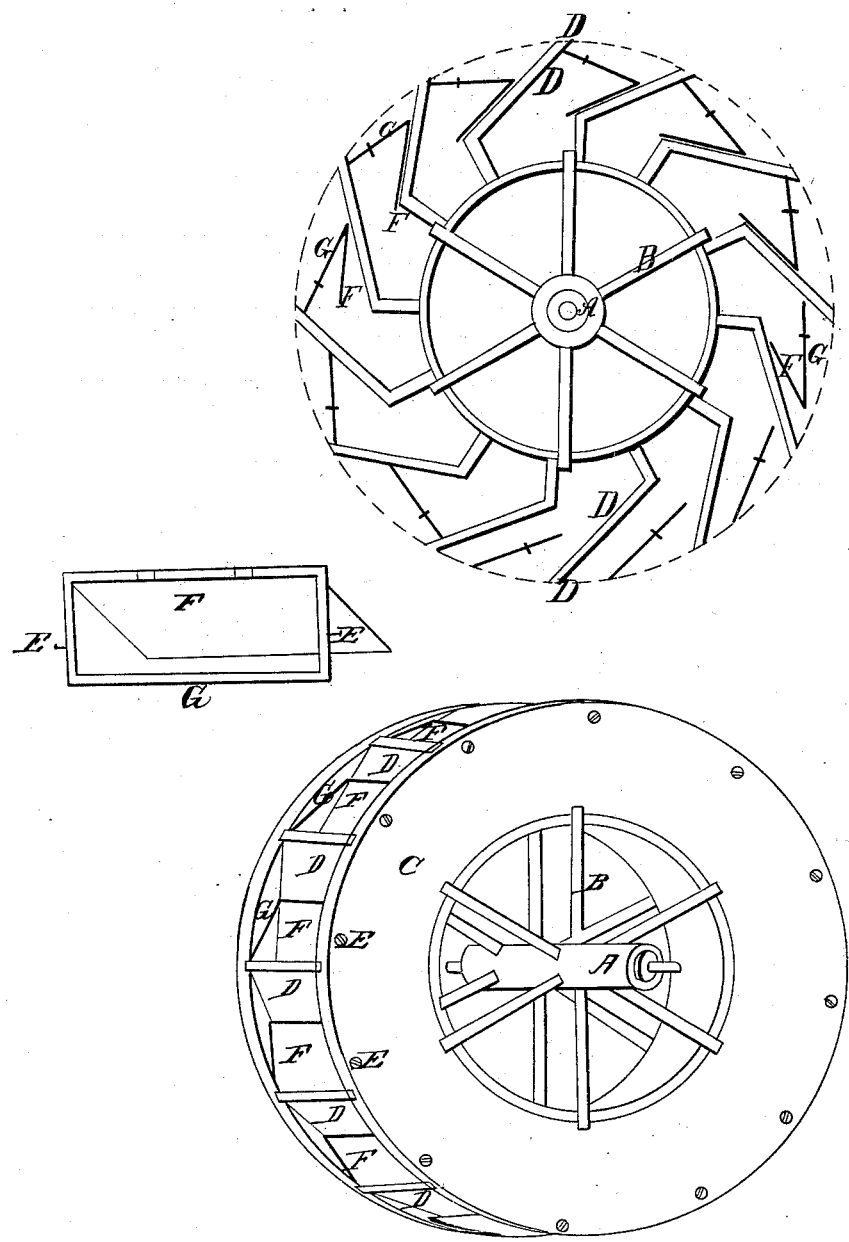

UNITED STATES PATENT OFFICE.

EDMUND SHEETZ, OF CAMPBELLSTOWN, PENNSYLVANIA.

OVERSHOT WATER-WHEEL.

Specification of Letters Patent No. 8,430, dated October 14, 1851.

*To all whom it may concern:*

Be it known that I, EDMUND SHEETZ, of Campbellstown, Londonderry township, county of Lebanon, and State of Pennsylvania, have invented a new and useful Improvement which I Call the "Improved Water-Saving Overshot Wheel"; and I do hereby declare that the following is a full and exact description thereof, reference being had to the accompanying drawings and to the letters of reference marked thereon, making a part of this specification.

The nature of my invention and improvement consists in the attachment of a self acting gate to each bucket of an overshot wheel, for the purpose of retaining the water in the bucket until it is carried to the lower part of the wheel—and thereby increasing the power and motion of the wheel.

To enable others skilled in the art to make and use my invention I will proceed to describe its construction and operation.

A represents the axle of the overshot water wheel; B, the arms; C, the frame of the wheel lined on the inside, which lining forms the flooring or bottom of the buckets; D, the bevel buckets supported by the frame C on each side; E, the screws or pivots upon which the frame G of the gates F operate; F, the gates. Each gate swings upon its own frame G and is open at top, as the wheel revolves, and the water passes through into the bucket. The gate rests upon the inclination of the bucket until the bucket is carried one fourth round the wheel, when the gate closes and rests against its own frame G, and the water in the bucket pressing against the lower part of the gate is retained in the bucket until it reaches the lower part of the wheel, when the gate opens, by the pressure of the water against the top of the gate and the water is immediately discharged, and the gate swings loose with its frame G until the bucket again reaches the center, when the gate again rests upon the inclination of the bucket and is open ready to receive the water, at the top of the wheel. G, the frames of the gates supported on each side near their centers, by screws or pivots E inserted into the frame of the wheel. These frames G are changeable and vary their angular positions with precision, according to the revolution of the wheel, and the pressure of the water against the gates.

What I claim as my invention and desire to secure by Letters Patent is—

The self acting gates attached to the buckets of an overshot water wheel, in the manner described and for the purposes herein set forth.

EDMUND SHEETZ.

Witnesses:
   THOS. KRAMER,
   WM. VOORHIS.